June 10, 1930.  J. B. MacNEILL ET AL  1,763,168
CONTROL MECHANISM
Filed Sept. 1, 1921   12 Sheets-Sheet 1
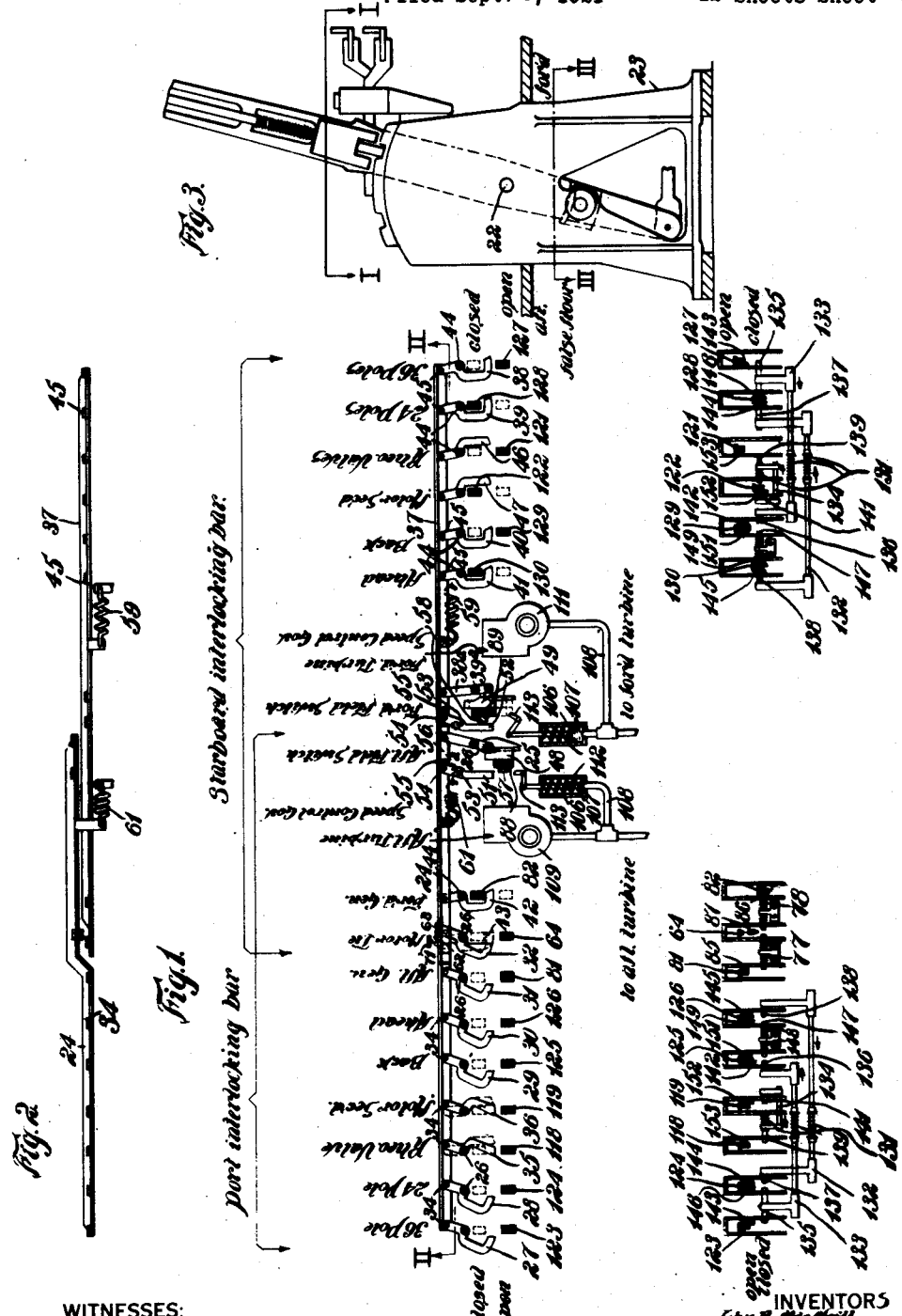
WITNESSES:
INVENTORS
ATTORNEY

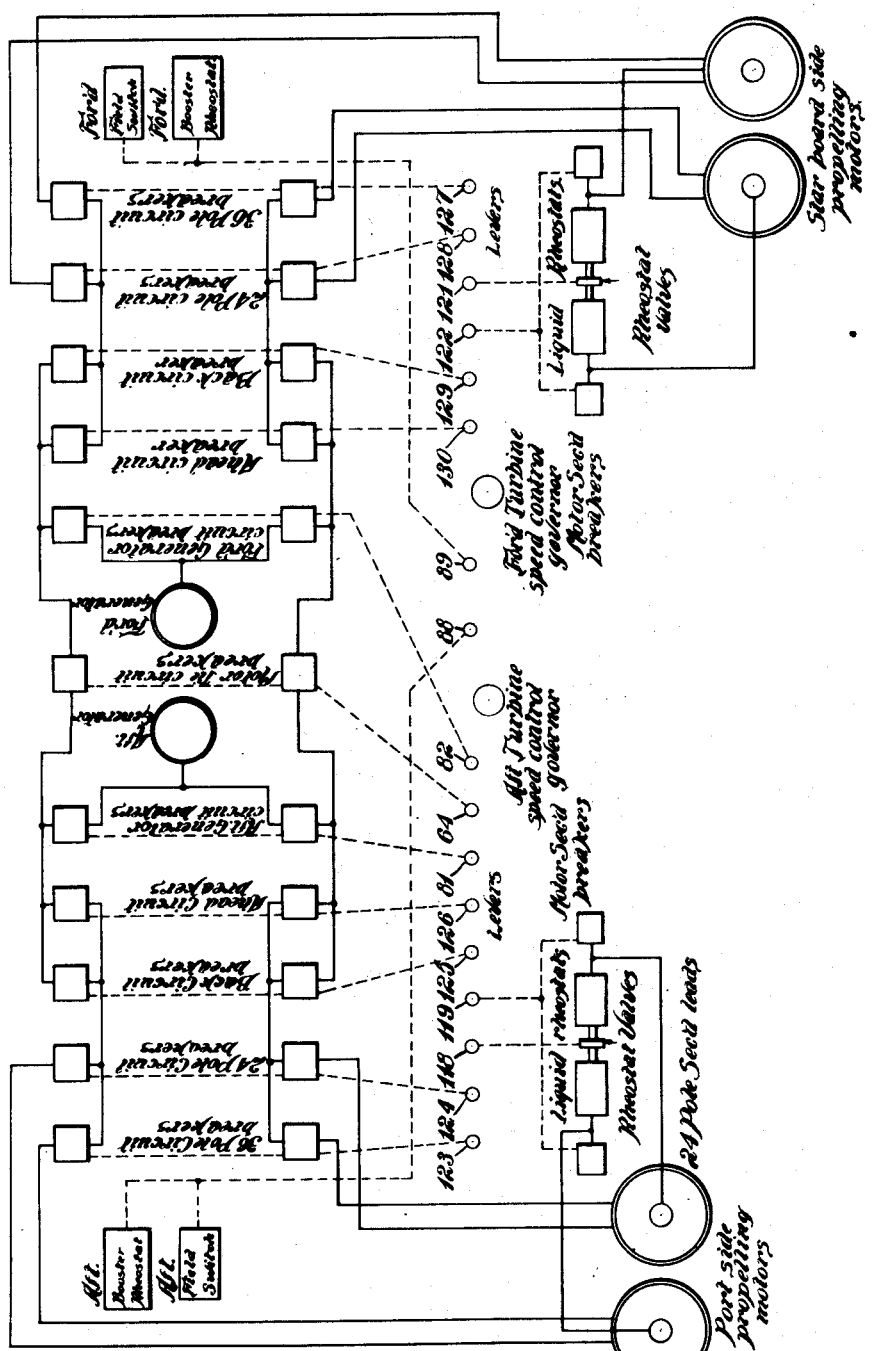

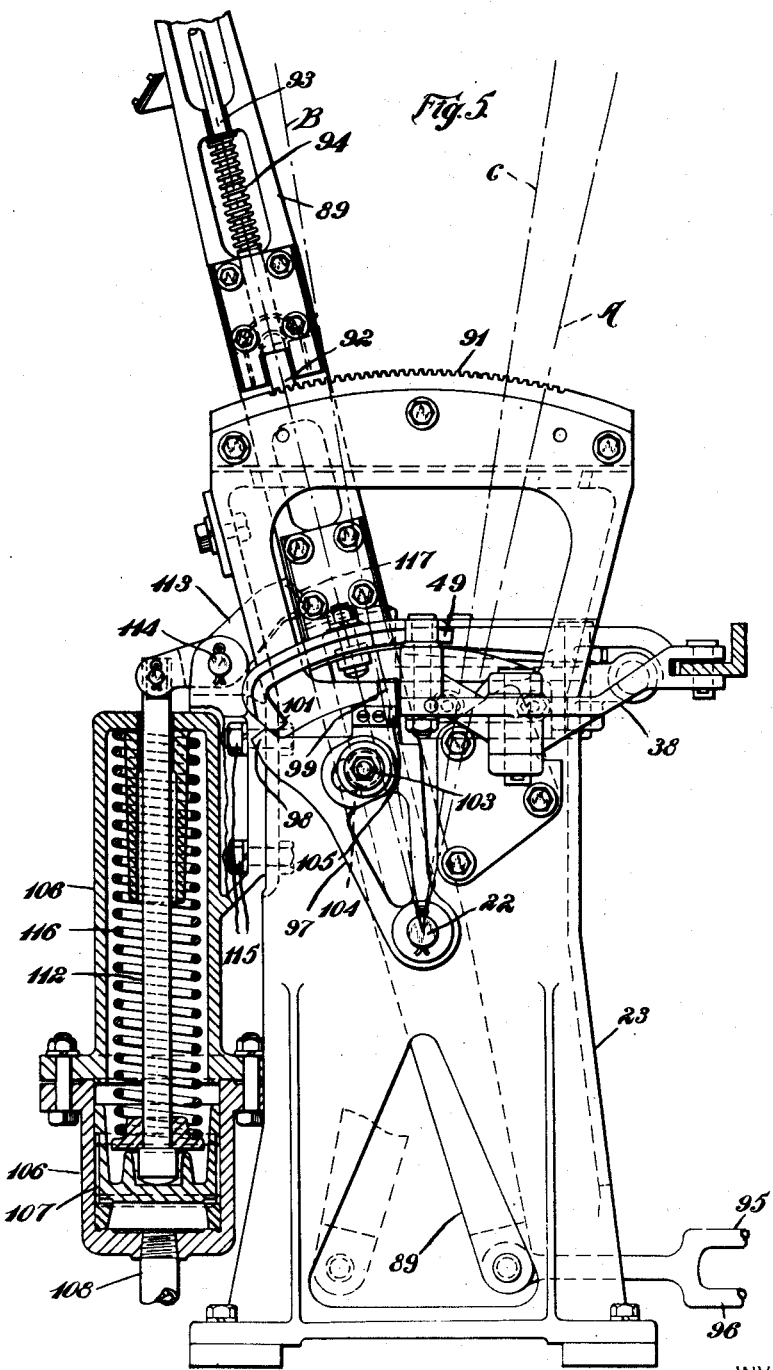

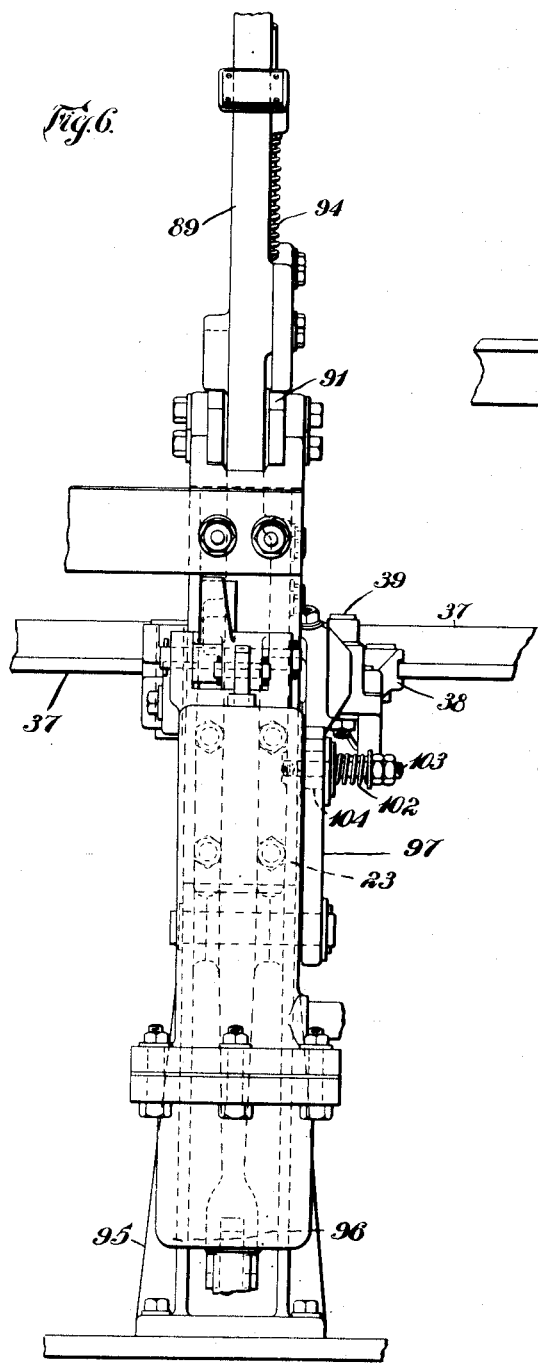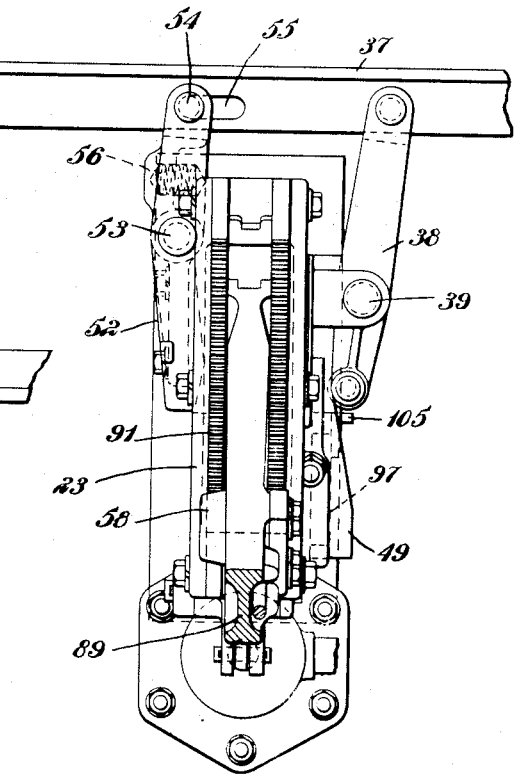

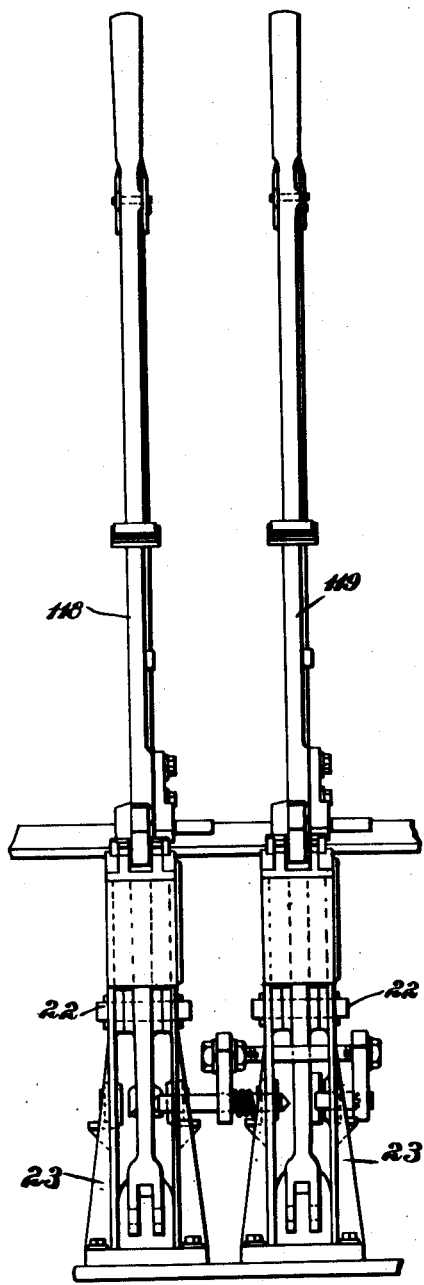
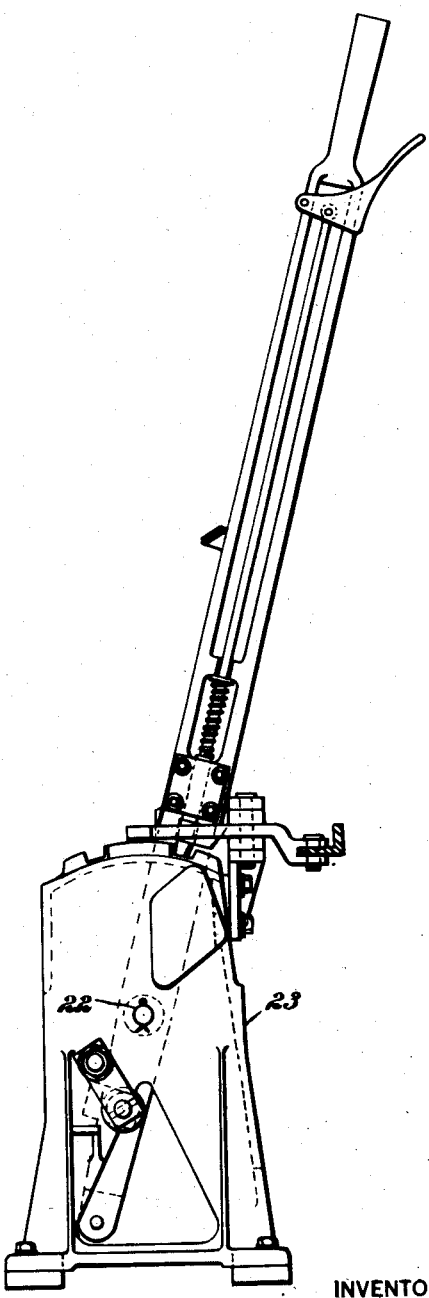

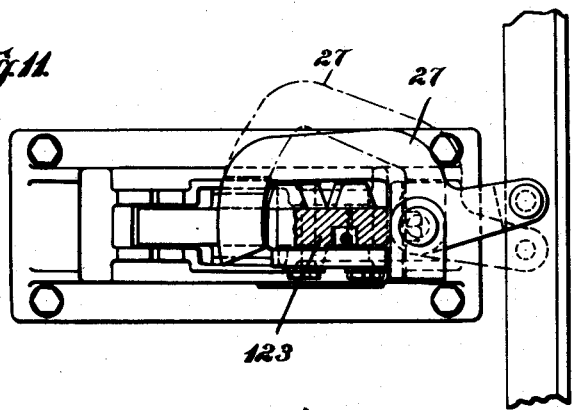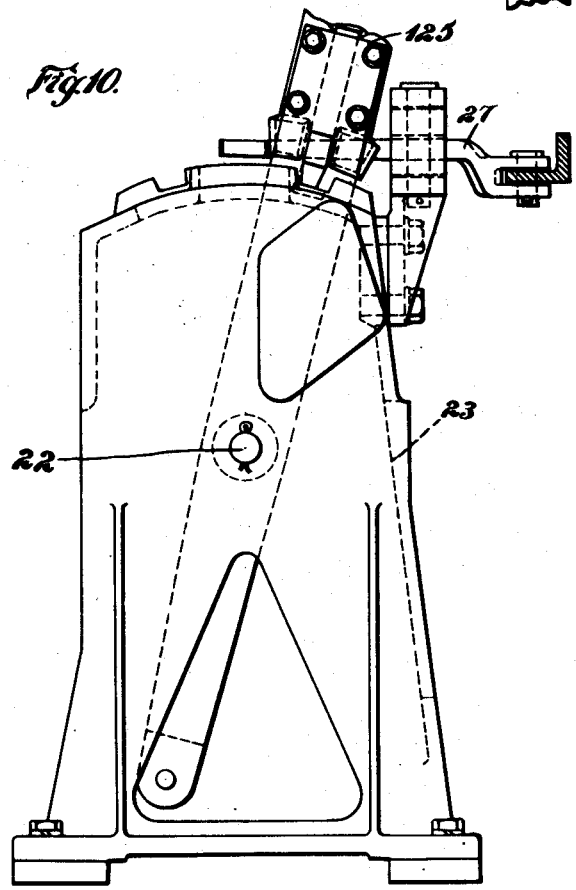

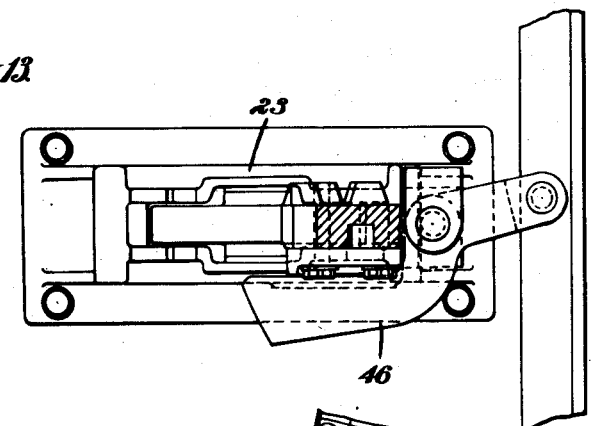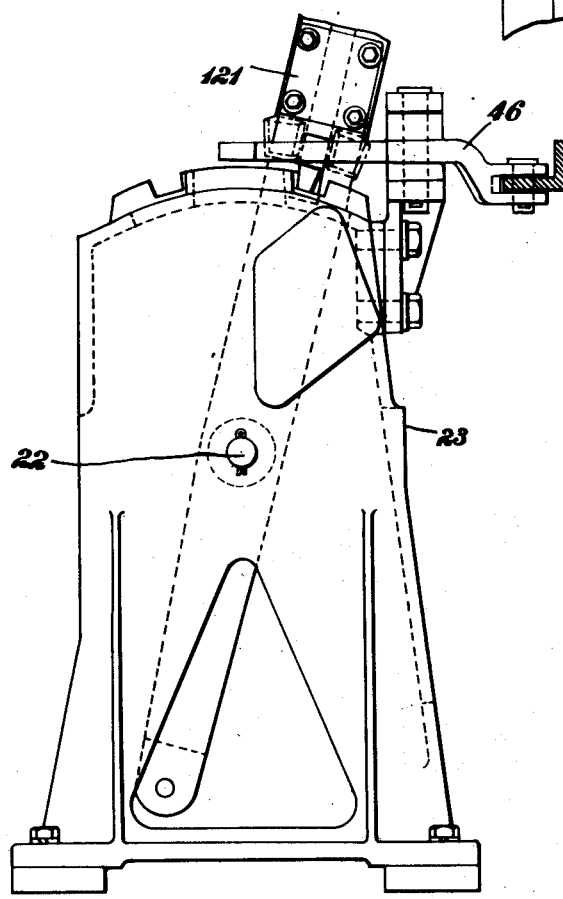

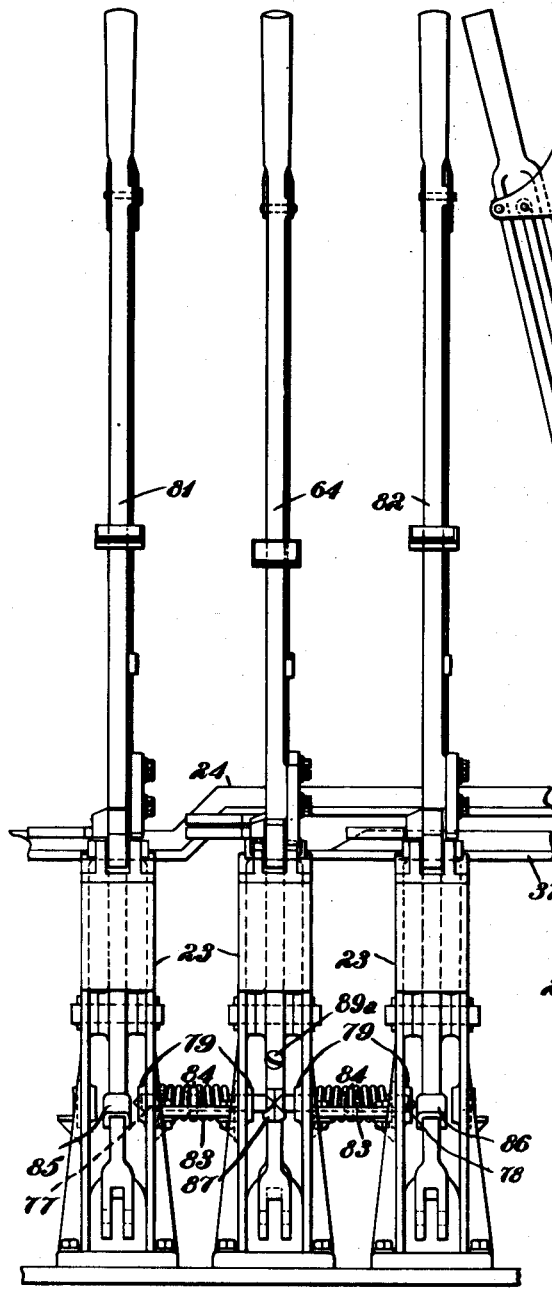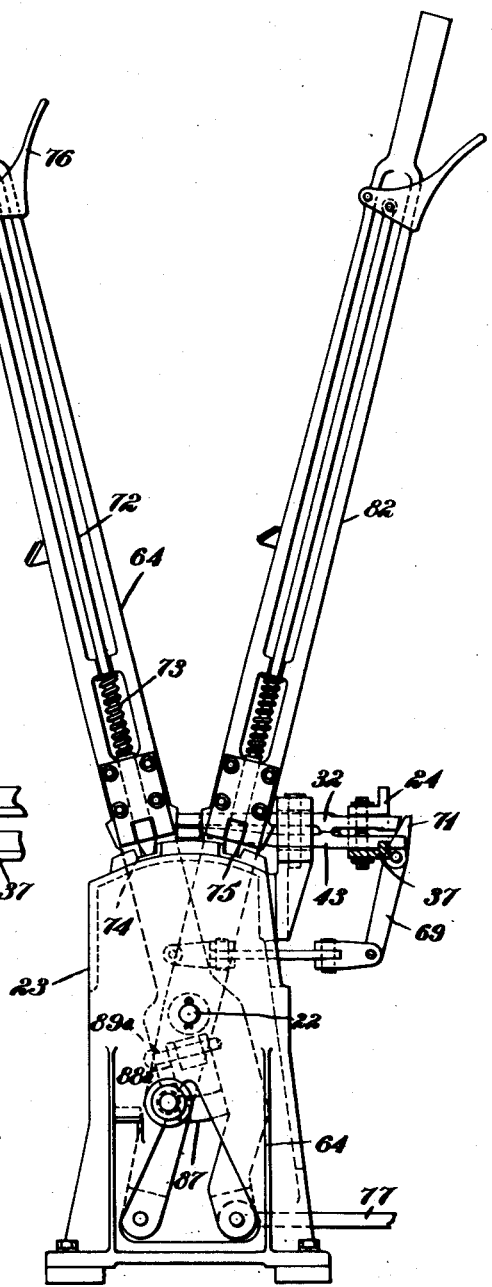

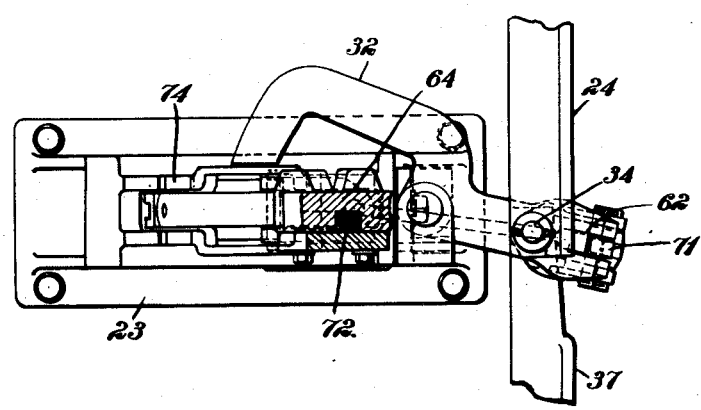
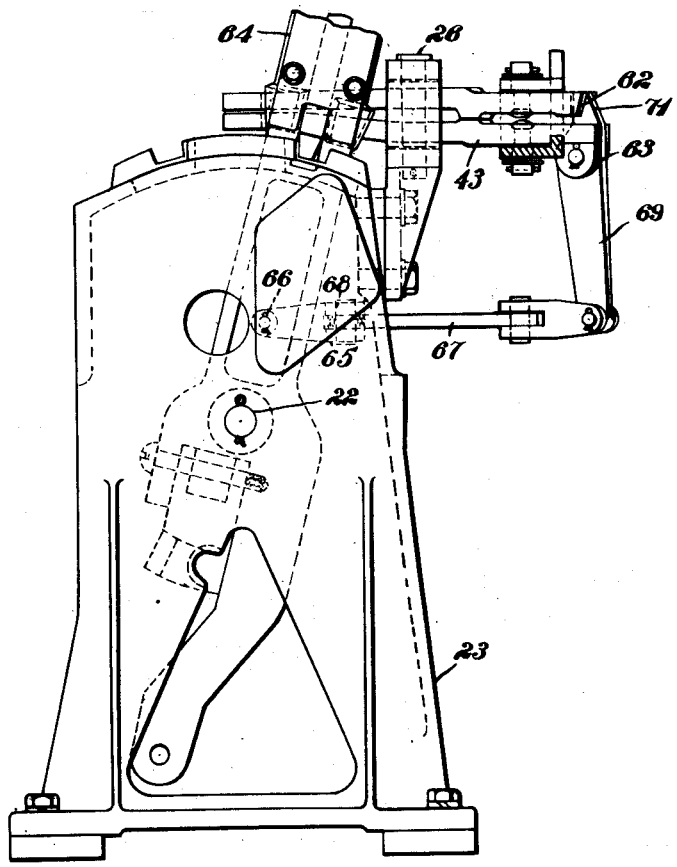

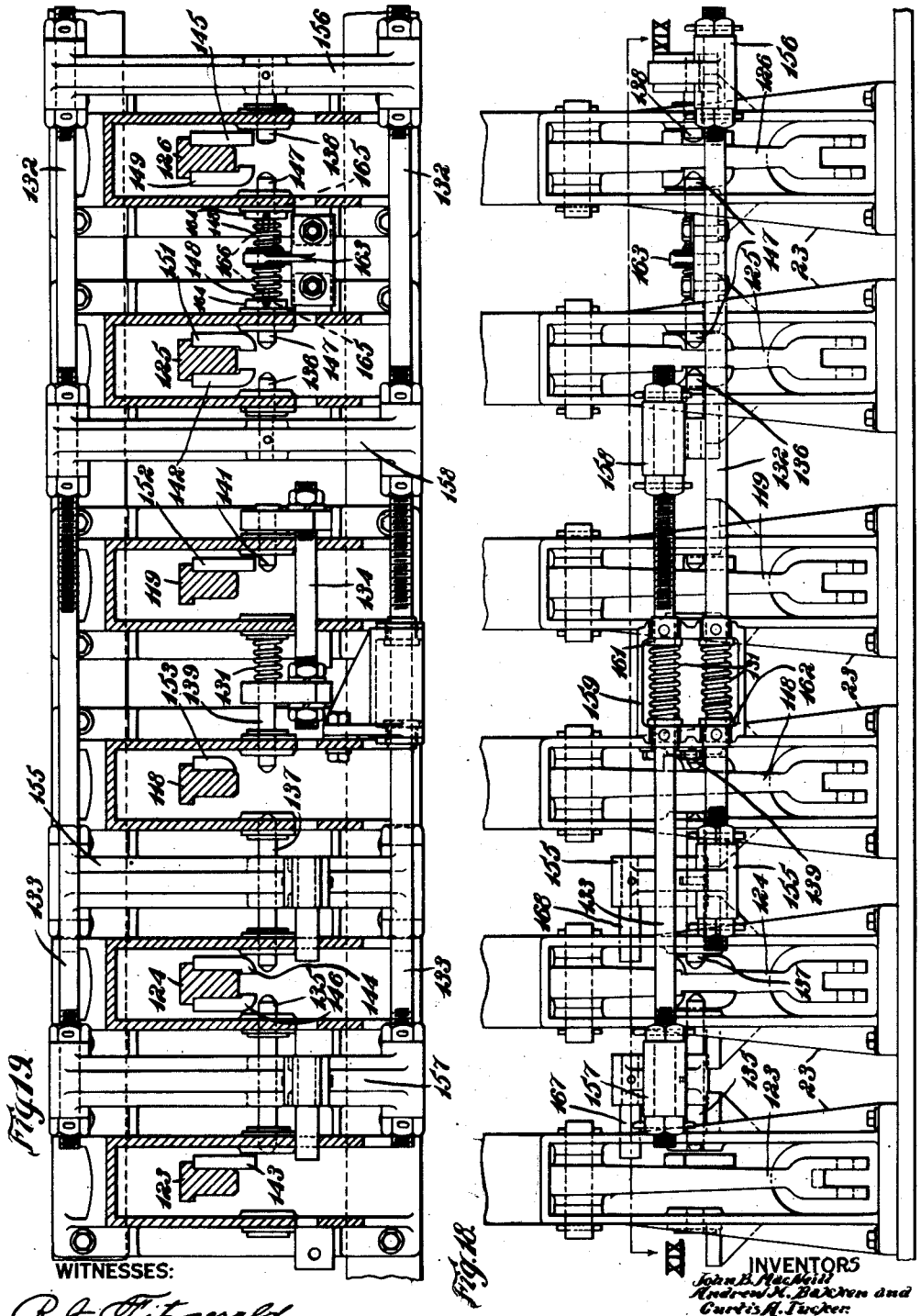

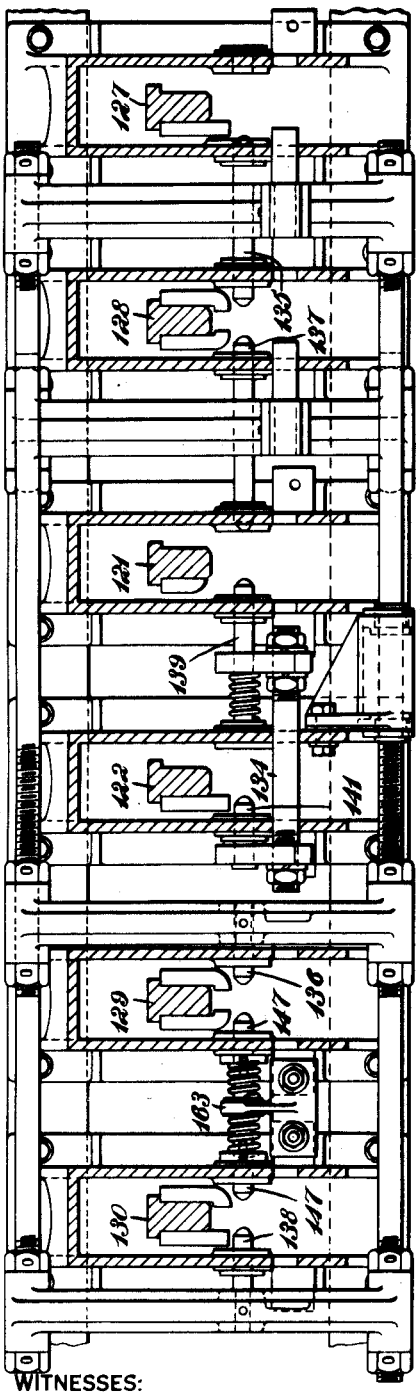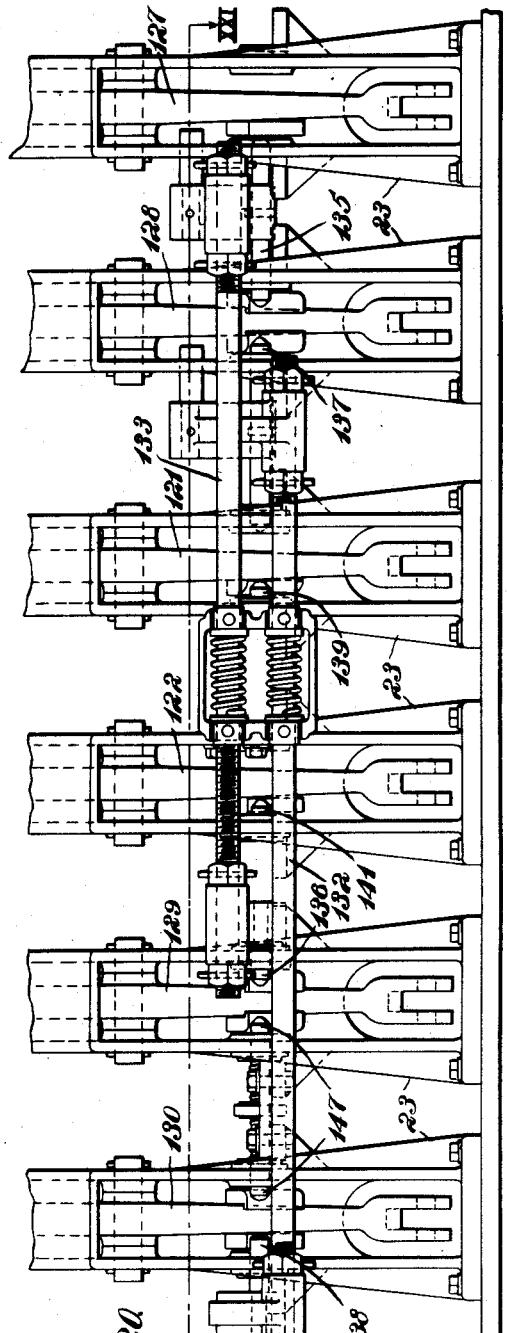

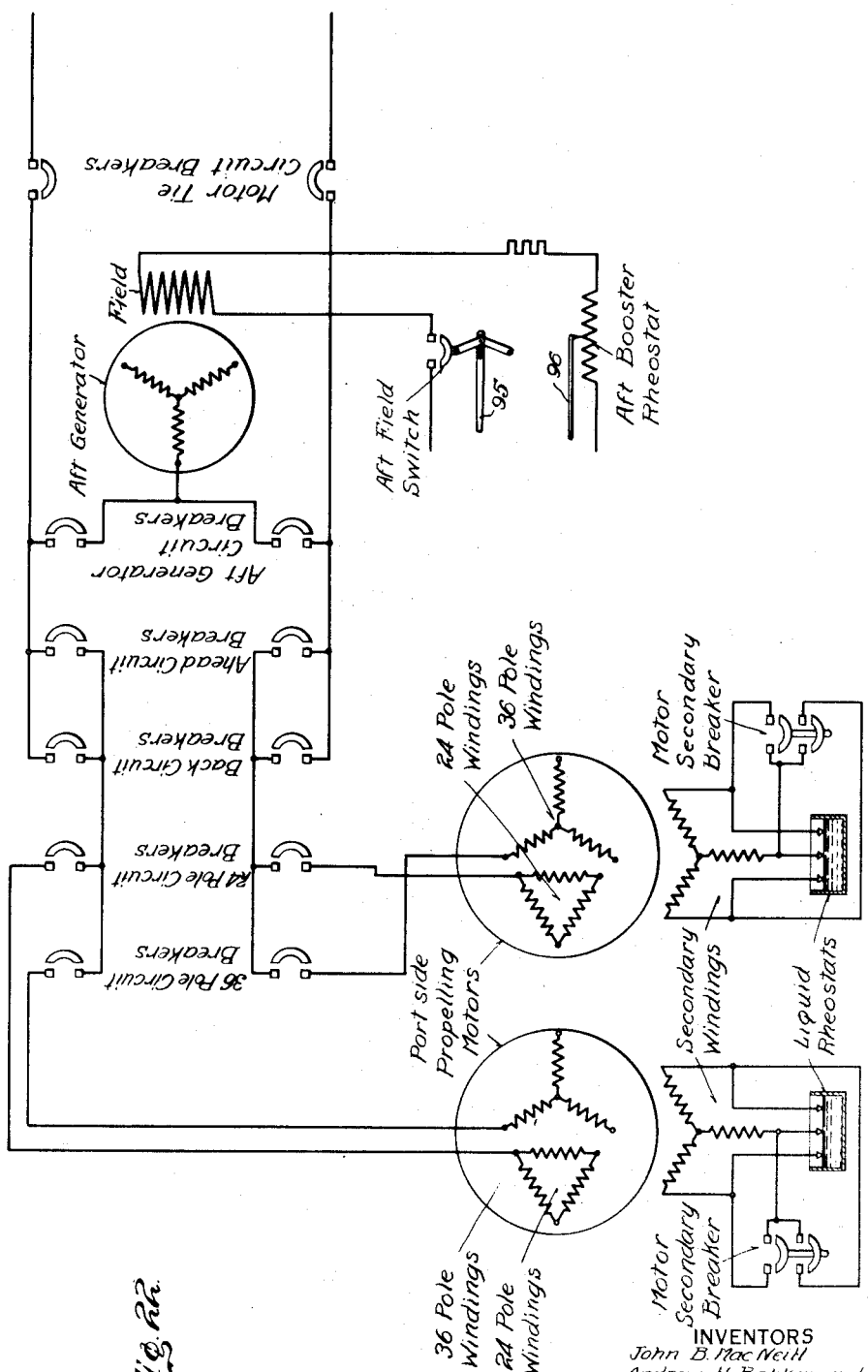

Patented June 10, 1930

1,763,168

UNITED STATES PATENT OFFICE

JOHN B. MacNEILL, OF WILKINSBURG, AND ANDREW H. BARKEN AND CURTIS A. TUCKER, OF EDGEWOOD PARK, PENNSYLVANIA, ASSIGNORS TO WESTINGHOUSE ELECTRIC AND MANUFACTURING COMPANY, A CORPORATION OF PENNSYLVANIA

CONTROL MECHANISM

Application filed September 1, 1921. Serial No. 497,765.

Our invention relates to electrical control mechanism and particularly to mechanism for controlling the operation of the electrical driving equipment for ships and installations having a plurality of generators and motors that are operated in various combinations and at various speeds.

One object of our invention is to provide a control mechanism wherein the equipment for controlling all of the generators and motors may be concentrated at a selected point or contained in a single operating room, and wherein all of the control levers are in view of the operator.
Another object of our invention is to provide a control mechanism, having the above characteristics, wherein the various switches and circuit breakers for controlling the various electrical equipment, such as generators and motors, are actuated by levers, and wherein the said levers switches and circuit breakers are so interlocked that it is impossible to operatively actuate a lever to close or open a switch or circuit breaker unless the remaining switches or circuit breakers are in such position as to insure proper operation.

Another object of our invention is to provide a control mechanism wherein the levers for actuating the various switches and circuit breakers are so interlocked that improper sequence of operation thereof is impossible, either in the starting operation, speed-changing operation, reversing operation, stopping operation or any operation of which the system is capable.

A further object of our invention is to provide a control mechanism, of the character described, that is so interlocked with the prime mover of the generator that the mechanism controlling the generators cannot be operatively actuated unless the prime movers or turbines are functioning properly, and rotating at predetermined speeds.

For the purpose of illustration, the control mechanism is herein shown as applied to the power apparatus for electrically driving a ship having four screw propellers, the installation comprising two steam turbines, two generators driven by the turbines, four motors, one for each screw propeller, which may receive current from a single generator or be so connected that each generator supplies current to two of the motors. Each motor is provided with a 24-pole winding for high-speed service and a 36-pole winding for cruising speeds, all of the motors being of the reversible type.

The accessories for the power mechanism include a manually-operable pressure governor control for each turbine, a field-winding switch for each generator that is controlled by the governor control, a separate rheostat for the field winding of each generator, separate circuit breakers for the 36-pole and 24-pole windings of each motor, a separate circuit breaker for each secondary winding or armature of each motor, a separate circuit breaker for controlling the current through the "ahead" circuit of each motor, a separate circuit breaker for controlling the current through the "back" or reverse circuit of each motor, a separate rheostat for regulating the torque of each motor, and a pair of tie circuit breakers whereby all of the motors may be connected to either generator.

A further object of our invention is to provide a control mechanism wherein the above accessories may be manually operated by a simple, positively-operating system of levers in which interlocking means are provided for absolutely insuring safe and proper sequence of operation and wherein it is impossible to actuate a lever, the operation of which would be instrumental in causing damage to the apparatus.

A further object of our invention is to provide a control system, of the character described, wherein, for a given ultimate operation, proper selection of power units must first be made by closing the necessary switches for successful operation before the field winding of the selected generator may be energized, and wherein such predetermined selection cannot be altered without first de-energizing the field winding of the generator selected.

A further object of our invention is to provide a control system wherein the field winding of either selected generator cannot be de-energized unless the speed of the turbine has been reduced to a predetermined degree. This prevents the sudden release of the turbine load with the coincident taxing of the over-speed governor. In addition, it assures that the control governor is set at a point where the turbine is caused to rotate at a speed at which the generator may safely be re-energized.

A further object of our invention is to provide a control system wherein the lever for actuating the field-winding switch also serves for regulating the field-winding resistance.

A further object of the invention is to provide a control system for the above power units wherein one of the generators may be connected with all of the motors, and wherein the operating levers for all of the motors may be so interlocked that improper operation is positively precluded.

A further object of our invention is to provide a control system wherein the control levers are arranged in a compact group within easy reach of the operator, and wherein the mechanism is rugged and durable and positive in its action.

These and other objects, that will be made apparent throughout the further description of the invention, are attained by means of the control mechanism hereinafter described, and illustrated in the accompanying drawings, wherein:

Figure 1 is a diagrammatic view of the complete interlocking control system, the upper portion being a horizontal section through the lever system, taken on the plane of line I—I of Fig. 3, while the lower portion is a horizontal section taken on the plane III—III of Fig. 3 and on the opposite side of the lever pivots;

Fig. 2 is a view, partly in section and partly in elevation, of the interlocking bars shown in Fig. 1, the section being taken on the plane of the line II—II of Fig. 1;

Fig. 3 is an elevation of a typical operating lever, showing the planes on which the sections of the diagrammatic view of Fig. 1 are taken;

Fig. 4 is a schematic diagram of the entire power system, with the exception of the turbines which may be considered as being connected, either directly or through reduction gearing, to the generators;

Fig. 5 is a side elevational view of one of the two generator-field-winding-switch-control levers which also control the field-winding resistance;

Fig. 6 is a front elevational view of the field-switch lever illustrated in Fig. 5;

Fig. 7 is a top plan view of the field-switch lever, shown in Figs. 5 and 6;

Fig. 8 is a front elevational view of a pair of typical circuit-breaker or rheostat-operating levers, showing the shuttle interlock carried by the levers for actuating the rheostat valves and circuit breakers for the secondaries or armatures of the port-side motors;

Fig. 9 is a side elevational view of the control levers illustrated in Fig. 8;

Fig. 10 is a side elevational view of a typical circuit-breaker lever having a "hook" interlock;

Fig. 11 is a top plan view of the lever and standard illustrated in Fig. 10;

Fig. 12 is a side elevational view of a typical circuit-breaker lever having a "stub" interlock;

Fig. 13 is a top plan view of the lever and standard illustrated in Fig. 12;

Fig. 14 is a front elevational view of a group of control levers, including the generator circuit breaker levers with a generator tie circuit-breaker lever disposed between them and showing the shuttle interlock therefor;

Fig. 15 is a side elevational view of the control levers shown in Fig. 14;

Fig. 16 is an enlarged side elevational view of the standard and lever for actuating the generator tie circuit breakers, showing the mechanism for tying the port and starboard motor-interlocking bars whereby they are made to function as a unit for interlocking the entire motor control with a single generator;

Fig. 17 is a top plan view of the standard and lever and tie mechanism illustrated in Fig. 16;

Fig. 18 is a front elevational view of the control standards and the levers for controlling the port-side motors, showing the shuttle interlock mechanism;

Fig. 19 is a horizontal sectional view, taken on the plane of the line XIX—XIX of Fig. 18;

Fig. 20 is a front elevational view of the control standards and the levers for controlling the starboard-side motors, showing the shuttle interlock mechanism;

Fig. 21 is a horizontal sectional view, taken on the line XXI—XXI of Fig. 20, and Fig. 22 is a wiring diagram illustrating the motor and generator winding connections for one phase of the three phase circuit.

Referring to the drawings and particularly to Figs. 1 and 4, the power apparatus to which the interlock control mechanism is applied comprises the power units and their accessories identified by appropriate legends as applied to the above figures, the power units and accessories being a forward and an aft turbine (not shown), a forward and an aft generator indicated by the legends "For'd generator" and "Aft generator"; two port-side and two starboard-side motors indicated by the legends "Port side propelling motors" and "Starboard side propelling motors", respectively, the motors having 24-pole and 36-pole field windings for full and cruising speeds, respectively, and capable of "ahead"

and "back" operation; a separate speed control governor for each turbine indicated by the legends "For'd turbine speed control governor" and "Aft turbine speed control governor"; a field-winding switch for each generator indicated by the legends "For'd field switch" and "Aft field switch"; a field resistor for each generator indicated by the legends "For'd booster rheostat" and "Aft booster rheostat"; a separate circuit breaker for the 36-pole and 24-pole motor field windings of each motor indicated by the legends "36-pole circuit breakers" and 24-pole circuit breakers, respectively; a separate circuit breaker for the "ahead" and "back" motor circuits for each motor indicated by the legends "Ahead circuit breakers" and "Back circuit breakers"; separate liquid rheostats for each motor indicated by the legend "Liquid rheostats"; separate circuit breaker for the secondary or armature winding of each motor indicated by the legend "Motor secondary breakers"; separate circuit breakers for each generator indicatd by the legends "For'd generator circuit breaker" and "Aft generator circuit breaker"; and a pair of tie circuit breakers indicated by the legend "Motor tie circuit breakers".

The circuit breakers, switches, rheostats and resistance elements are manually operable by means of a system of levers and interlocking mechanism, illustrated diagrammatically in Figs. 1, 2 and 3, the group of motor control levers, disposed on the left-hand side of Fig. 1, being marked by the legends "36 pole", "24 pole", "Rheostat valves", "Motor secondary", "Back" and "Ahead", actuate the 36-pole breakers, the 24-pole breakers, the liquid-rheostat valves, the breakers for backing, and the ahead breakers of the port-side propelling motors.

The group of motor-control levers disposed at the right-hand side of Fig. 1 are marked by the legends "36 pole", "24 pole", "Rheostat valves", "Motor secondary", "Back" and "Ahead", and actuate the 36-pole breakers, the 24-pole breakers, the liquid-rheostat valves, the breakers for backing and the "ahead" breakers of the starboard-side propelling motors.

The three levers disposed on the right-hand end of the port-side group of levers, illustrated in Fig. 1 and marked "Aft generator", "Motor tie" and "For'd generator" are for actuating the aft-generator breakers, the motor-tie breakers and the forward-generator breakers, respectively.

The levers marked "Aft field switch" and "For'd field switch" are for actuating the aft-field and forward-field circuit breakers, respectively, and their respective resistance elements.

In the diagram illustrated in Fig. 4, the simple wiring connections are illustrated in full lines while the broken lines indicate the mechanical operating connections between the operating levers and their respective circuit breakers, switches, rheostat valves and resistance elements which consist of various rods and bell-crank levers designed to suit conditions of installation. Each lever is connected to two controlling elements, one for each propelling motor, and it will be understood that, in the event of failure of one of the motors or a controlling element, the connection with its respective control lever may be disconnected, and operation continued on the remaining motor while repairs are being made.

It is an object of our invention to so interlock the field-winding switch levers with the remaining levers that no selection of motors or windings thereof can be made while the field-winding switches are closed, with the exception that the levers of the rheostat valves and motor secondaries may be actuated at will while the field-winding switches are closed but may not be operated unless the field-winding switch is first closed.

With this end in view, all of the switch levers are alined in a row opposite the tiers of circuit breakers, as indicated in Fig. 4. Each lever is mounted in a similar standard 23 (see Fig. 3) and pivoted upon a stationary shaft 22 and is provided with a suitable means for releasably holding the lever in either open or closed position, and in the case of the field-winding switch and resistance levers, in any intermediate positions. The latching mechanism will be hereinafter described when the levers are described in detail.

The aft field-winding switch lever is operatively connected to an interlocking bar 24 which is disposed to the rear of the switch levers by means of a pawl lever 25 that turns about the stationary pivot 26ª which is secured to the standard of the aft field-winding switch lever. Hook locks 27, 28, 29, 30, 31 and 32 are pivoted in stationary shafts 26 on the standards 23 of the 36-pole, the 24-pole, the back, the ahead, the aft-generator, the motor-tie and the forward-generator levers, respectively, and are pivoted, by means of bolts 34, to the interlocking bar 24 in such manner that the free hook ends of the locks normally lie clear of the operating levers which are indicated by solid-back rectangles in Fig. 1, when the aft field-switch lever is in the open position indicated in Fig. 1.

When the field-winding switch is in open position, the levers guarded by the hook locks 27 to 32, inclusive, may be closed, with the exception that certain levers will be locked out by a shuttle interlock mechanism that engages the lower ends of the operating levers and which will be hereinafter described in detail.

When the aft field-winding switch lever is moved to closed position, the interlocking bar 24 is moved toward the left and the hook locks 27 to 32, inclusive, are turned counter-clockwise, thus swinging the hook ends in front of such operating levers that have been selected and moved to their closed positions, indicated by dotted rectangles, and to the rear of such that were not selected and moved. Therefore, after the aft field-winding switch is moved to closed position, none of the levers for controlling the port-side propelling motors can be opened or closed or their relative arrangement altered until the field-winding switch has been moved to the open position indicated by the solid black rectangle 88. The open and closed positions of the levers are indicated by the legends "Open" and "Closed" at the left of Fig. 1.

The standards 23, to which the rheostat-valve lever and the motor-secondary lever of the port-side operating motors are pivoted, are provided with stub locks 35 and 36, respectively, which are pivoted by means of bolts 34 to the interlocking bar 24 and, when the aft field-winding switch lever is in open position, lie behind the levers 118 and 119 of the rheostat valve and motor secondary, respectively, and prevent their selection or movement to closed position so long as the aft field-winding switch is in open position.

When the aft feld-winding switch is moved to closed position, the stub locks 35 and 36 are turned by the bar 24 to the position indicated by dotted lines in Fig. 1. The rheostat-valve lever and the motor-secondary lever may then be manipulated to control the speed of the port-side propelling motors but in a sequence of operation determined by a shuttle interlock to be subsequently described herein in detail.

The operating levers for controlling the starboard-side propelling motors, namely, the 36-pole, the 24-pole, the rheostat valve, the motor-secondary, the back, the ahead and the forward-generator levers are all pivotally mounted in separate standards 23 and turn about separate shafts 22, Fig. 3. A starboard-side interlocking bar 37 is disposed behind the levers and is operatively connected to the forward field-winding switch lever by a pawl lever 38ª which turns about the pivot 39ª carried by the forward-field-switch-lever standard and is pivotally connected to the interlocking bar 37.

Hook locks 38, 39, 40, 41 and 42 are pivoted on stationary shafts 44 that are carried by the standards of the 36-pole, the 24-pole, the back, the ahead and the forward-generator levers, respectively, and the hook lock 43 is pivoted beneath the hook lock 32 upon the shaft 26 carried upon the standard for the motor-tie lever. The hook locks 32 and 43 differ from the others in that they are provided with means whereby they may be tied together to cause the bars 24 and 37 to operate as a unit. This feature will be more fully hereinafter described.

The hook locks 38 to 43, inclusive, are so pivoted, by means of bolts 45, to the starboard locking bar 37 that they function similar to the hook locks attached to the port-side bar 24; that is, they prevent movement of any operating lever associated therewith after the forward-generator-field-winding switch has been closed.

Stub locks 46 and 47 are pivotally mounted upon the shafts 44 carried by the standards for the rheostat-valve and motor-secondary levers, respectively, and prevent closing movement of the said levers so long as the forward-generator-field-winding switch is in open position. When the forward field-winding switch is closed, the hook locks and stub locks occupy the positions indicated in full lines in Fig. 1.

As illustrated in Fig. 1, the forward-generator lever 82, the ahead lever 130 and the 24-pole lever 128 are locked in closed position while the 36-pole lever 127 and the back lever 129 are locked open. The motor-secondary lever 122 is closed but is free to be opened, and the rheostat-valve lever 121 is open. The forward field-winding switch 89 is closed while the aft field-winding switch 88 is open, as well as all port-side motor-control levers. Under these conditions, the starboard-side propelling motors are operating full-speed ahead on the 24-pole winding, with all resistance cut out of the liquid rheostats. The port-side motors are idle.

The operating levers for the starboard motors are also provided with shuttle interlocking mechanism, diagrammatically illustrated in Fig. 1 and shown in detail in Figs. 20 and 21, for the purpose of preventing improper selection of the levers for a "set up." This interlocking mechanism will be hereinafter described in detail.

Referring to Fig. 1, it will be seen that the aft field-winding switch lever 88 and the forward field-winding switch lever 89 are provided with cams 48 and 49, respectively, for engaging the free ends of the pawl levers 25 and 38ª, respectively, which causes counter-clockwise turning of the levers 25 and 38ª when the field-winding switch levers are moved to closed position. This movement of the pawl levers 25 and 38ª causes locking movement of the interlocking bars 24 and 37, respectively.

Locking pawls 51 and 52 are pivoted to the standards 23 for the aft field-winding switch and forward field-winding switch levers, respectively, by means of shafts 53 and these are connected to the interlocking bars 24 and 37 by means of pins 54 which operate in slots 55 in the bars 24 and 37 that are provided to furnish a lost-motion connection between the pawls and the bars. Springs 56 (see Figs. 1 and 7) are so interposed between the standards and the locking pawls that they tend to normally press the free ends thereof toward their respective operating levers. The aft and forward field-winding switch levers are provided with lugs 57 and 58, respectively, that are so positioned thereon that, when, for instance, the forward field-winding switch lever 89 is moved to the open position, indicated by dotted lines in Fig. 1, the pawl 52 will drop in behind it and prevent reclosing of the field-winding switch unless the interlocking bar 37 is returned to its open position.

Referring to Fig. 1, it will be seen that, if the forward field-winding switch were moved to open position, the bar 37, which is normally yieldingly retained in open position by means of the spring 59 that is attached, at one end, to the standard 23 for the starboard-ahead breaker lever, will not be returned by the spring 59 for the reason that the free end of the stub lock 47 engages the motor secondary lever for the starboard motor and prevents movement of the interlocking bar.

After the aft field-winding switch lever has once been withdrawn, the lug 58 thereupon engages the free end of the pawl 52 and prevents reclosing of the lever. Before the forward field-winding switch lever can again be closed, it is necessary, therefore, to withdraw or open the motor-secondary lever so that the stub lock 47 may clear the lever and permit the spring 59 to return the bar 37 to open position with a snap action. Should the rheostat-valve lever 121 be in the closed position, it must similarly be withdrawn to clear the stub lock 46. The final movement of the bar causes the left end of the slot 55 therein to engage the pin or bolt 54 and move the free end of the pawl out of the path of the lug 58.

The pawl 51, associated with the aft field-winding switch lever, functions in a similar manner for preventing reclosing of the aft field-winding switch lever so long as the interlocking bar 24 is prevented from being returned to open position by the spring 61 which is similar to the spring 59 in function and construction. It is, therefore, impossible, to reclose the field-winding switch after it is once opened, while the motor secondary or rheostat-valve levers are closed.

In the event that one of the generator units is out of commission for any reason whatsoever, it is desirable that all of the propelling motors be driven by the remaining generator and that the interlocking devices function in the usual manner. With this end in view, the hook locks 32 and 43, connected to the interlocking bars 24 and 37, respectively, are provided, at their rear ends, with notches 62 and 63, respectively, that register when both interlocking bars are in open position.

The hook locks 32 and 43 are illustrated in detail in Figs. 14, 15, 16 and 17. Referring particularly to Figs. 16 and 17, it will be seen that the motor-tie-breaker-operating lever, indicated by the numeral 64, is pivoted to a shaft 22. A clevis 65 is pivoted, at one end, by a pin 66 to the lever 64 and, at the opposite end, to a connecting link 67 by means of a pin 68 disposed at right angles to the pin 66, thus providing a universal-joint connection between the link and a tie lever 69 that is pivoted in the slot 63 of the hook lock 43. The upper end of the tie lever is provided with a tongue 71 which enters the slot 62 when the slots 62 and 63 are registered and when the tie lever is moved into operative position by the closing movement of the breaker lever 64. Because of the universal-joint connection of the tie lever 69 to the tie-breaker lever, the interlocking bars 24 and 37 may be moved as a unit by either of the field-winding switch levers.

It will be observed that the lever 64 (see Figs. 14, 15 and 16), which is a representative lever handle, is provided with a latch rod 72 which is normally so pressed downward by a spring 73 that the lower end thereof may be pressed into notches 74 and 75 to retain the lever in either its open or its closed position. A release trigger 76 is pivoted to the outer end of the lever adjacent the handle thereof and serves to raise the rod clear of the notches when the trigger is pressed toward the handle. It is apparent, therefore, that, once the handle is moved to open or closed position, it will be retained therein by the latch rod 72. When the tie-breaker handle 64 is moved to closed position, the tie breakers are closed by the connecting mechanism and the tie lever 69 is moved to tieing relation with the hook locks 32 and 43 and the interlocking bars 24 and 37. In Fig. 15, the tie lever is shown in open position wherein free relative movement of the tie bars is permitted.

When the tie breakers are closed, it is essential that one of the generators shall deliver no current. Therefore, provision is made to prevent the tie breakers from being closed when both generator breakers are closed or for preventing the closing of a generator breaker when the other generator breakers and the tie breakers are closed.

This is accomplished by a shuttle interlock mechanism illustrated in detail in Figs. 14 and 15 and diagrammatically illustrated in Fig. 1, and comprises a pair of shuttle bars 77 and 78 that are mounted for longitudinal movement in bearings 79 in the standards 23 for the aft and forward-generator-switch levers 81 and 82, respectively, and in the standard for the tie-breaker lever which is disposed midway between them.

The shuttle bars 77 and 78 are centered by helical springs 83 that are disposed on the respective sides of the collars 84 which are secured to the central portion of the shuttle bars. The springs abut the outer ends of the bearings 79 and, being of equal strength and elasticity, tend to normally yieldingly retain the shuttle bars in a predetermined relation wherein movement of the aft-generator-breaker lever 81 and the forward-generator-breaker lever 82 is permitted without interference.

As shown in Figs. 1 and 14, the levers 81 and 82 are provided with cams 85 and 86, respectively, which engage the ends of the shuttle bars 77 and 78, respectively, when such bars are displaced by a floating cam 87 pivotally mounted within a clevis 88ᵃ on the lower end of the tie-breaker lever 64, by means of a pivot pin 89ᵃ.

When the tie breaker is open, the generator-breaker levers 81 and 82 may be closed separately or at the same time and, when both levers 81 and 82 are in closed position, the cams 85 and 86 are registered with the outer ends of the shuttle bars 77 and 78, respectively. At such time, there is not sufficient space between the adjacent ends of the shuttle bars to permit the cam 87 to pass therebetween and, therefore, closing movement of the tie breaker lever 64 is prevented.

When one generator lever, for instance, the forward generator breaker lever 82, is in closed position, displacement of the shuttle bar 78 is prevented by the cam 86, but the floating cam 87 carried by the tie-breaker lever 64 is displaced thereby when the lever 64 is moved to closed position and displaces the shuttle bar 77 across the path of movement of the cam 85 mounted on the aft-generator-breaker lever 81, locking the lever 81 in open position. The lever 81 cannot be closed until the one or the other of the levers 64 and 82 are moved to open position. When the aft-generator-breaker lever 81 is closed and the tie breaker is closed, it is impossible to close the forward-generator-breaker lever 82. It is apparent, therefore, that it is impossible to parallel the generators.

Referring to Fig. 1, and particularly to Figs. 5, 6 and 7, wherein the field-switch and field-resistance levers are shown in detail, it will be understood that the aft field-switch lever, hereinafter designated by the numeral 88, and the forward field-switch lever, hereinafter designated by the numeral 89, are identical in construction, and that a description of the mechanism of the forward field-switch lever 89 will suffice for both levers.

It will be understood that the lever 89 performs two functions, primarily, it serves to close the field switch (not herein shown) which is preferably of a snap-action type and is opened and closed after the operating lever has moved a considerable distance; and, secondarily, the lever serves to operate the field resistance between the limits of travel wherein the lever does not affect operation of the field switch.

The standard 23 which supports the lever 89 is similar to others employed in the system with the exception that certain accessories are attached thereto for performing functions peculiar to the field-winding switch levers. The standard is provided with a toothed sector 91 into which a toothed stop member 92 meshes for retaining the lever 89 in any desired position. The stop member 92 is attached to a latch rod 93 which is normally held in the sector-engaging position by means of a helical spring 94. The outer end of the rod is attached to a trigger-release member similar to that illustrated in Figs. 14 and 15 for the purpose of withdrawing the stop member 92 out of engagement with the teeth of the sector when it is desired to shift the position of the lever 89.

The lower end of the lever 89 is pivotally attached to a field-winding-switch-operating rod 95 and a field-resistance-operating rod 96 which are reciprocated by means of the lever 89. It will be understood that, when the lever occupies the position illustrated in full lines in Fig. 5, and when the lever occupies the closed position indicated by the dot-and-dash line A in Fig. 5, the field switch is in open and in closed position, respectively. It will also be understood that the field switch is moved to open position during the travel of the lever 89 from the position indicated by the dot-and-dash line B to the full open position, and that the field-winding switch is moved to closed position only by the movement of the lever 89 from the dot-and-dash line position C to the position indicated by the dot-and-dash line A.

The field resistance (not shown in detail) is so designed that the adjustable-resistance element thereof is actuated by the lever 89 during its travel between the positions B and C. When it is desired to close the field-winding switch, it is necessary to move the lever 89 from the open position to the closed position A. The field-winding switch will then remain closed until the lever 89 is again returned to its full-open position, indicated in full lines in Fig. 5.

After the field-winding switch has been moved to the full-closed position A, the field resistance may be regulated to suit operating conditions by adjusting the operating lever 89 at any desired position along the sector and locking it therein by means of the toothed stop member 92 carried by the lever 89. When the lever is in the position C, the resistance of the field-winding circuit is practically zero, the resistance being increased as the lever 89 is moved toward position B, wherein the resistance is a maximum value.

As previously stated, when the forward field-winding switch lever 89 is moved to closed position, the interlocking bar 37 is moved toward the left by means of the pawl link 38ᵃ which is displaced by the cam 49 that is carried by the lever 89. In view of the fact that the lever 89 is shifted between positions B and C for the purpose of varying the field resistance, it is necessary to provide means for locking the interlocking bar 37 in closed position. For this purpose, a toothed sector 97 is pivotally mounted on the shaft 22 and is provided with teeth 98 and 99 between which a tooth 101, which projects downwardly from the cam 49, operates, thereby providing a lost-motion connection between the operating lever 39 and the sector 97.

The sector is frictionally retained in its extreme operative positions by means of a compression spring 102 that is mounted upon a bolt 103 that projects through an oval slot 104 in the sector 97 and which is securely mounted upon the standard 23. When the field-winding switch lever 89 is moved to open position, the projection 101 engages the tooth 98 of the sector 97 and moves it to a position wherein a stop 105, that is bolted to the sector 97, clears the free end of the operating lever 38. When the lever 89 is moved toward closed position, the projection 101 engages the tooth 99 of the sector after the lever is moved beyond the position C and nearly into full-closed position. Final movement of the lever 89, which causes the field switch to be closed, also causes the sector 97 to be moved into such position that the stop 105 lies between the free end of the pawl lever 38 and the adjacent side of the standard 23.

So long as the sector 97 is in the closed position, the interlocking bar 37 is locked in closed position. The lever 89 may then be moved to any desired position between the positions B and C without disturbing or moving the sector 97. Final opening movement of the lever 89 withdraws the stop 105 clear of the free end of the pawl lever 38 and permits the spring 59, Fig. 1, to return the locking bar to its open position.

It will be understood that the interlocking bar 24 is similarly locked in closed position by means of the pawl lever 25 and a stop member 105, which is mounted on the sector 97 of the aft field-switch lever standard.

It is an object of our invention to so interlock the speed-governor control with the field-winding-switch mechanism that the field-winding switch can only be opened when the turbine speed has been reduced to a predetermined degree, at which speed it will be safe to again close the generator-field-winding switches without injury to the generators.

With this object in view, each field-winding-switch standard 23 (see Figs. 1 and 5) is provided with a cylinder 106 containing a fluid-actuated piston 107 which is made responsive to fluid pressure of the governor-control device through the medium of a pipe 108 which connects a fluid chamber of the governor-control device with the lower end of the cylinder 106.

The cylinder 106, which is associated with the aft field-switch lever, is connected to the aft-turbine speed-control governor device 109 and the cylinder 106, which is associated with the forward field-switch lever, is connected by a pipe 108 to the forward turbine speed-control-governor device 111 (see Fig. 1).

The piston 107 is provided with a piston rod 112 which projects from the upper portion of the cylinder and is pivoted to a locking pawl 113 which is pivoted to the cylinder casing by means of a pin 114. The cylinder 106 is secured to the standard by means of the bolts 115. A helical spring 116 is encased within the upper portion of the cylinder 106 and serves to normally yieldingly retain the piston 107 in its lowermost position, wherein the free end of the pawl 113 registers with a notch 117 provided in the field-winding-switch lever.

The tension of the spring 116 is so regulated that it yieldingly holds the piston 107 in its lowermost position, when the turbine is operating at a reduced speed at which it is safe to open or close the field switch, and when the pressure in the governor is correspondingly reduced. When the turbine is operating at driving speeds, the fluid pressure in the turbine-governor-control device is correspondingly increased, and the pressure supplied to the cylinder 106 is sufficient to cause the piston to be raised against the tension of the spring 116 and to thereby lower the free end of the latch pawl 113 out of registry with the notch 117 in the field-winding switch lever.

So long as the pressure generated by the turbine at driving speed remains above a predetermined point, the latch pawl 113 prevents the final opening movement of the field-switch lever beyond the position B shown in Fig. 5. Therefore, in order to open the field-winding switch, it is first necessary to reduce the speed of the turbine. It is assumed that the turbine speed will not again be increased before the field switch is closed for the reason that there is no object in increasing the speed of the turbine so long as there is no load applied thereto.

Referring to Figs. 8 to 13, inclusive, typical circuit-breaker and rheostat-valve-operating levers are illustrated in detail, showing typical hook locks and stub locks. The levers illustrated in Fig. 8 are the rheostat-valve lever and the motor-secondary-breaker lever, hereinafter designated by the numerals 118 and 119, respectively. These levers are for controlling the rheostat valves and the motor-secondary breakers associated with the port-side propelling motors. These levers are mounted in the usual standards 23 and are pivoted for rotation about the shafts 22. Each lever is provided with a latch rod similar to those previously described in connection with the generator-breaker levers 81 and 82 and, therefore, a detailed description thereof will be unnecessary. The levers 118 and 119 for controlling the rheostat valves and motor secondaries of the port-side motors and the corresponding levers 121 and 122, respectively, for controlling the rheostat valves and motor secondaries of the starboard-side propelling motors are provided with stub locks 35, 36, 46 and 47, respectively. A typical stub lock 46, for instance, the stub lock associated with the lever 121, is illustrated in detail in Figs. 12 and 13.

For the purpose of illustration, the 36-pole, the 24-pole, the back, the ahead and the aft generator-switch levers associated with the port-side motors are designated by the numerals 123, 124, 125, and 126, and the corresponding levers for the starboard-side levers associated with the starboard-side propelling motors are designated, respectively, by the numerals 127, 128, 129 and 130. All of the last named levers are associated with hook locks. Figs. 10 and 11 illustrate a typical lever standard equipped with hook locks. The lever and standard illustrated in Figs. 10 and 11 may, for illustration, be considered as a standard for the 36-pole lever of the port-side motors and the hook lock 27 is shown in full lines in locked position with the lever 123 in closed position. The dot-and-dash lines indicate the open position of the hook lock.

It is an object of our invention to so interlock the various levers of the system that it is impossible to make an improper selection for what may be termed an operating "set-up". It is also an object to provide an interlocking mechanism wherein the proper sequence of operation is insured so that it is impossible to close or open a switch in the wrong order of operation. This interlock mechanism comprises a plurality of shuttle bars that are mounted in the various lever standards for longitudinal movement with respect thereto and they are illustrated diagrammatically in Fig. 1 and in detail in Figs. 18 to 21. Shuttle-bar interlock mechanism is associated with the levers and standards for the 36-pole breakers, 24-pole breakers, the rheostat valves, the motor-secondary breakers, the breakers for backing and the ahead breakers for both the port and starboard-side propelling motors. Each group of levers is provided with a similar shuttle bar interlock with the exception that the various elements of one group are disposed in reverse order with respect to the other.

Referring to the diagrammatic view illustrated in Fig. 1, the operation of the shuttle-bar interlocks will be described. First, it must be understood that the various shuttle bars illustrated are normally moved in the direction of the arrows associated therewith by means of compression springs 131 and that the springs normally retain the shuttle bars in the positions shown in the group associated with the levers for the port-side propelling motors. Each group contains three main shuttle bars 132, 133 and 134, and each bar carries two lever stops.

For the purpose of illustration, the group of shuttle bars for controlling the port-side motors will be considered. The shuttle bar 133 carries, at its left-hand end, a stop bar 135 which is associated with the levers 123 and 124 for the 36-pole and 24-pole breakers, respectively. The same shuttle bar carries, at its right-hand end, a stop bar 136 that is associated with the lever 125 for the breaker for backing. The shuttle bar 132 carries at its left-hand end, a stop bar 137 that is associated with the lever 124 and, at its right-hand end, a stop bar 138 that is associated with the lever 126. The shuttle bar 134 carries, at its left-hand end, a stop bar 139 that is associated with the lever 118 and, at its right-hand end, a stop bar 141 that is associated with the lever 119.

It will be observed that, when the 36-pole lever 123 is moved to closed position, indicated in dotted lines, movement of the shuttle stop bar 135 toward the left will be prevented. Therefore, the cam on the lever 125 cannot displace the shuttle bar 133 sufficiently to let the lever pass to closed position. Consequently, the circuit breaker for backing cannot be closed while the 36-pole circuit breaker is in closed position.

If the lever for the circuit breaker 125 for backing is closed first, the cam 142 thereof will displace the shuttle bar 133 toward the left and move the stop bar 135 across the path of the cam 143 of the lever 123, thereby preventing the closing of the 36-pole circuit breaker while the breaker for backing is in closed position. It will be observed, however, that the lever 124 of the 24-pole breaker may be closed after the lever 125 for the breaker for backing is moved to closed position.

It will be observed that the lever 126 for the ahead breaker cannot be closed until the stop bar 138, carried by the shuttle bar 132, is first displaced toward the right. The only way that this bar can be displaced is by closing movement of the lever 124 of the 24-pole breaker, during which movement the cam 144 of the lever 124 engages the stop bar 137 and moves it to the right a sufficient distance for the bar 138 to clear the cam 145 of the lever 126. The ahead breaker may, therefore, be closed if the 24-pole breaker has been previously closed, but it will be seen that, when the 24-pole breaker is closed, the cam 146 of the lever 124 displaces the lock bar 135 across the path of the cam 143 of the 36-pole lever 123 and insures that the 36-pole breaker cannot be closed so long as the 24-pole breaker is closed.

In order to operate the 36-pole winding of the motor in the ahead operation, it is necessary first to close the 24-pole lever 124, then to close the ahead-breaker lever 126, then to withdraw the 24-pole lever 124 and close the 36-pole lever 123.

In order to insure that the ahead breakers and the breakers for backing cannot be closed at the same time, a shuttle bar 147 is disposed between the levers 126 and 125 which is yieldingly maintained in a central position therebetween by means of springs 148. When the ahead-breaker lever 126 is moved to closed position, the cam 149 engages the shuttle bar 147 and moves it across the path of the cam 151, carried by the lever 125. Therefore, when the lever for the ahead breaker is closed, the lever 125 for the breaker for backing is locked in open position, and vice versa.

In order to insure that the rheostat valve shall be closed prior to the operation of the motor secondary, the shuttle bar 134 is so mounted that the stop bar 141 normally lies across the path of the cam 152 of the motor secondary lever 119. When the rheostat valve lever 118 is moved to closed position, the cam 153 thereon engages the stop bar 139 and causes the stop bar 141 to be displaced clear of the cam 152. After the rheostat valve has been closed, the motor secondary lever 119 may be subsequently closed.

The corresponding group of levers for controlling the starboard-side propelling motors are interlocked in the same manner and, therefore, it is not necessary to describe, in detail, the manner in which the various levers are interlocked. As illustrated in Fig. 1, the forward generator breaker is locked in closed position and the motor is operated with the 24-pole winding in the ahead operation. The motor secondary breaker is closed and the rheostat valve is open. The various shuttle bars are shown in the positions occupied with such a "set-up".

Assuming that it is desired to make a similar "set-up" for the port-side motors, it is first necessary to move the aft generator breaker to closed position. This is possible, inasmuch as the tie-breaker lever is in open position. The 24-pole breaker lever 124 should next be moved to closed position, thus displacing the stop bar 138 to permit the ahead-breaker lever 126 to be moved to closed position.

When the above selection has been made by closing the 24-pole breaker and the ahead levers, the aft field-switch lever 88 is then moved to closed position, causing the hook locks to move into position wherein they lock the 24-pole lever, the ahead lever and the aft-generator lever in closed position and the 36-pole lever, the tie-breaker lever and the back lever in open position. The closing movement of the interlocking bar 24 also causes the stub locks 35 and 36 to move clear of the levers 118 and 119 so that they may be closed in their proper order.

The rheostat-valve lever 118 is then moved to closed position to decrease the resistance in series with the motor secondaries, this operation causing the displacement of the stop bar 141 clear of the cam 152 of the motor secondary lever 119. The motor secondary lever may then be closed for short-circuiting the resistance and increasing the speed of the motor to its normal running speed. It will be observed that, after the field-winding switch has been closed, all levers, except those for operating the motor secondary and the rheostat valves, are locked in their selected positions. The motor-secondary levers and the rheostat levers may be moved to suit operating conditions.

Referring to Figs. 18 to 21, wherein the shuttle mechanism is illustrated in detail, it will be seen that Figs. 18 and 19 illustrate the shuttle mechanism for the port-side levers and Figs. 20 and 21 illustrate the mechanism for the starboard-side levers.

Referring particularly to Figs. 18 and 19, it will be seen that the standards 23 for the port-side levers 123, 124, 118, 119, 125 and 126 are alined in a group, and that the shuttle bars 132 and 133 previously referred to are in reality separate pairs of bars, one bar of each pair being disposed on opposite sides of the group. The bars 132 overlap the bars 133 and are disposed beneath the former and are connected at their ends by means of cross trusses 155 and 156. The bars 133 are connected, at their ends, by means of cross trusses 157 and 158. The bars 132 and 133 on the front side of the group pass through a spring housing 159 which encloses the springs 131 previously referred to. The spring on the bar 133 abuts a collar 161 that is secured to, and moves with, the bar and tends to move the bar toward the right, while the spring on the bar 132 abuts a washer 162 that is secured to, and moves with, the bar 132 and tends to move the bar toward the left. Movement of the bars is limited by the collars 161 and 162.

The cross trusses 157 and 158 carry the stop bars 135 and 136, respectively, and the cross trusses 155 and 156 carry the stop bars 137 and 138, respectively. The shuttle bar 134 extends through the housing for the lever 119 and carries the stop bars 139 and 141. The spring 131, surrounding the stop bar 139, tends to move the shuttle bar toward the left. The shuttle stop bar 147 is mounted for longitudinal movement in the adjacent walls of the standards for the levers 125 and 126. A bracket 163 is mounted between the said standards, the bar extending through a perforation in the bracket. Springs 148, which surround the bar 147, abut against opposite sides of the bracket 163 and against the washers 164 which are slidably mounted on the stop shuttle bar 147. Each washer 164 is provided with a pin 165 which extends through slots 166 in the stop shuttle bar 147. It will be apparent that the springs serve to center the shuttle bar 147 and that the bar may be displaced longitudinally by the cams 151 and 149 that are secured to the levers 125 and 126, respectively.

The cross trusses 157 and 155 are provided with guide pins or dowels 167 and 168, respectively, which project through bearing openings in the right-hand sides of the standards 23 for the levers 123 and 124, respectively. These pins serve to prevent rotation of the shuttle bars 133 and 137, respectively, about their respective stop bars as an axis. They also serve as a bearing for the cross trusses and relieve the stop bars of the lateral thrust.

In view of the fact that the details of construction of the control lever and shuttle interlocks for the starboard-side motors are identical to those for the port side just described, with the exception that they are arranged in reverse order, it is, therefore, unnnecessary to describe in detail their construction which is clearly illustrated in Figs. 20 and 21 and to which appropriate reference numerals have been applied corresponding with those shown in the diagrammatic view in Fig. 1.

Referring to the diagram illustrated in Fig. 4, it will be seen that the circuit breakers and accessories for the motors may be connected to one generator by opening the circuit breakers of the other generator and by closing the tie breakers, and referring to the diagram shown in Fig. 1, it will be apparent that the interlocking bars 37 and 24 may be connected by the lever for the tie breakers when that lever is moved to closed position. As has been previously pointed out, one condition that must be fulfilled before the tie breakers can be closed or the interlocking systems tied together is that both field switches must be opened. If one is closed, either the hook lock 32 or the hook lock 43 will prevent the closing of the tie lever.

After the tie lever is closed, only one of the generator breakers may be closed. The second generator breaker is locked out by either the shuttle bar 77 or the shuttle bar 78, depending, of course, upon which generator breaker is selected. Thus, it will be seen that it is impossible to parallel the generators and thereby overtax the circuit breakers.

Assuming that all of the levers are opened and that it is desired to run the ship ahead with both generators and all motors working at economical cruising speed, that is, with the motors operating on the 46-pole squirrel-cage winding, the operation is as follows:

The aft and forward speed-control governors are first opened sufficiently to turn over the turbines at reduced speed without load. The forward and aft generator circuit breakers are then closed. The ahead-breaker levers are locked open by the shuttle lock bars 138 and can only be released by first closing the 24-pole circuit breaker. It is, therefore, impossible to start on the 36-pole squirrel-cage windings of the motors which, as is well known, are not well adapted for starting but are economical for cruising purposes. In the case of the 24-pole secondary winding, the starting resistance may be imposed by the rheostat valve, and the starting torque increased, as desired.

For the reasons above given, it is not expedient to start with the 36-pole winding or to use the 36-pole winding for reverse or back propelling. Provision is made, therefore, for preventing the closing of the breakers for backing while the 36-pole breakers are in closed position. The shuttle lock bars 136 engage the cams 142 when the 36-pole levers are closed and prevent closing movement of the levers for the breakers for backing.

After the 24-pole levers have been closed, the ahead levers are moved to closed position. Closing movement of the levers for the rheostat valves and motor-secondary breakers is precluded by the stub locks 35—46 and 36—47, respectively, until after they are displaced by closing movement of the aft and forward field-switch levers. When the field-switch levers have been closed, all of the selected levers are locked in closed position and the remaining levers, with the exception of the rheostat-valve and motor-secondary levers, are locked in open position by their respective hook locks.

The rheostat-valve levers and the motor-secondary levers may then be closed, but closing of the rheostat-valve levers must be accomplished to increase starting resistance before the motor-secondary levers are closed. This operation is insured by the stop bars 141 which lie across the path of the cams 152 until they are displaced by the cams 153 which engage and displace the stop bars 139 when the rheostat valve-levers are moved to closed positions. The power supplied by the turbines is then adjusted by means of the turbine governor controls 109 and 111 and by the movement of the booster rheostats by the levers 88 and 89.

The ship at this time is being propelled ahead by the motors operating on the 24-pole winding and it is on this "set-up" that the ship is driven at full speed ahead. When it is desired to operate at cruising speed, it is necessary to open the 24-pole switch and then close the 36-pole switch. In order to accomplish this operation, it is first necessary to open the field switches so that the interlocking bars 24 and 37 may be returned to open position by the springs 61 and 59, respectively, and release the 36-pole and the 24-pole levers.

The field-winding switches cannot be opened until the turbine speed is reduced sufficiently to permit the pawls 113 to clear the field-winding-switch levers. This is done by readjusting the turbine speed-control governors. As previously stated, once the field-winding-switch levers are moved to open position, they cannot be reclosed until the interlocking bars are returned to open position, which operation moves the pawls 51 and 52 clear of the stops 57 and 58, respectively, carried by the field-winding-switch levers 88 and 89, respectively.

After the field-winding-switch levers are moved to open position, the interlocking bars 24 and 37 cannot return to open position until the rheostat-valve and motor-secondary levers are moved to open position so that they permit the lever to clear the stub locks 35, 36, 46 and 47 which have prevented opening movement of the locking bar.

The aft and forward generator lever and the ahead levers are left in closed position. The 36-pole levers may then be moved to closed position. The field switch may then be closed and the levers locked. The turbine speed may then be increased and the field-winding-resistance lever adjusted to suit operating requirements.

To stop the motors, the speed-control-governor valve is adjusted to reduce the speed of the turbine and reduce the pressure in the cylinder 106. The pawls 113 are withdrawn and the field-winding-switch levers may then be opened.

If the rheostat-valve and motor-secondary levers controlled by the stub locks are open, the interlocking bars will be returned to open position by the springs 61 and 59. The various levers may then be moved to open position.

The procedure for reverse or back operation is the same as for ahead operation except that the back lever is moved to closed position instead of the ahead lever and the latter is locked open by the shuttle bar 147 which is displaced across the path of the cam 149 by the cam 151 on the back lever. Under no conditions can the breakers for the 36-pole winding be closed while the breaker for backing or the back lever is closed.

One of the generators may be disconnected from the system and the port-side and starboard-side motors connected to the remaining generator by closing the tie-breaker lever and then one of the generator-breaker levers. When the tie-breaker lever is closed, the interlocking bars are tied together in the manner previously described and, so long as the tie-breaker lever is closed, both of the interlocking bars are under the control of the field switch for the generator that is connected in the motor circuits.

While the control apparatus, as illustrated and described, is shown as applied to a propelling power plant of a ship and which comprises two generators and four motors, it will be observed that the mechanism is of such flexibility that its application may be extended to control mechanism for power units for other purposes and having a great variety of generators, motors and accessories, and the invention is not limited to the specific application herein described and illustrated.

While we have described and illustrated but one embodiment of our invention, it will be apparent to those skilled in the art, that various changes, modifications, substitutions, additions and omissions may be made in the apparatus illustrated without departing from the spirit and scope of the invention, as set forth in the appended claims.

We claim as our invention:

1. The combination with an electric generator, an electric motor to be energized therefrom and having a secondary winding, a resistance device for said secondary winding, and means whereby operation of the resistance device is precluded prior to the energization of the field of the feeding generator.

2. The combination with an electric generator having a field winding, an electric motor to be energized therefrom, and having a secondary winding, a circuit interrupter for the secondary winding, a resistance device for the motor secondary winding and a circuit interrupter for the generator field winding, of means for preventing the closing of the secondary-winding interrupter and the operation of the resistance device prior to the closing of the field-winding interrupter.

3. The combination with an electric generator, an electric motor to be energized therefrom and having a secondary winding, a circuit interrupter for the secondary winding, a resistance device for the motor secondary winding and a circuit interrupter for the generator field winding, of means for preventing the closing of the secondary-winding interrupter prior to the rendering of the resistance device operative.

4. The combination with an electric motor having two separate stator windings, and a separate circuit breaker for each winding, a circuit interrupter for controlling the ahead operation of the motor and a circuit interrupter for controlling the reverse operation of the motor, of means for normally holding the interrupter for controlling the ahead operation of the motor in open position, and means actuated by one of the interrupters for the stator windings for displacing the said means to permit closing movement of the interrupter for controlling ahead operation when the said stator-winding interrupter is moved to closed position.

5. The combination with an electric motor having two separate stator windings, a separate circuit interrupter for each winding, a circuit interrupter for controlling the ahead operation of the motor, a circuit interrupter for controlling the reverse operation of the motor, and means for normally holding the interrupter for controlling the ahead operation in open position, of means actuated by closing movement of one of the interrupters for the stator windings for simultaneously locking the other interrupter for the stator windings in open position and releasing the said holding means to permit closing movement of the interrupter for controlling ahead movement of the motor.

6. The combination with an electric motor having two separate stator windings, a separate circuit interrupter for each winding, a circuit interrupter for controlling the ahead operation of the motor, and a circuit interrupter for controlling the reverse operation of the motor, of means actuated by closing movement of the interrupter for controlling reverse operation of the motor for simultaneously locking the interrupter for controlling ahead operation of the motor and one of the interrupters for the stator windings in open position.

7. The combination with an electric generator, a current-responsive element to be energized from the generator, a plurality of control devices for the current-responsive element and a control mechanism for the field winding of the generator, of interlocking means for the control devices for the current-responsive element so interlocked with the control mechanism for the field winding that certain of the control devices are locked in open position while the said control mechanism is in open position.

8. The combination with an electric generator, a current-responsive element to be energized from the generator, a plurality of control devices for the current-responsive element and a control mechanism for the field winding of the generator, of interlocking means for the control devices for the current-responsive element so interlocked with the control mechanism for the field winding that certain of the control devices are locked in open position while the said control mechanism is in open position or in closed position when the said control mechanism is in closed position.

9. The combination with an electric generator, a current-responsive element to be energized from the generator, a plurality of control devices for the current-responsive element and a control mechanism for the field winding of the generator, of means for so interlocking the control devices for the current-responsive element that operation thereof in a predetermined sequence is required and means controlled by the controlled mechanism for the said field winding for preventing the operation of said control devices after the said control mechanism is moved to closed position.

10. The combination with an electric generator, a current-responsive element to be energized from the generator, a plurality of control devices for the current-responsive element and a control mechanism for the generator, of means for so interlocking the control devices for the current-responsive element that operation thereof in a predetermined sequence is required and means controlled by the control mechanism for the said field winding for preventing the operation of said control device after the control mechanism is moved to closed position.

11. The combination with an electric generator, a current-responsive element to be energized by the generator, a control device for the current-responsive element and a control mechanism for the generator, of means controlled by the control mechanism for the generator for holding the control device for the current-responsive element in open position when the said control mechanism is in open position and for permitting closing movement of the said control device when the control mechanism is in closed position, and means for preventing closing movement of the said control mechanism when the said control device is in closed position.

12. The combination with an electric generator, a turbine for driving the generator, a means responsive to the turbine speed and a control device for the generator field, of means co-operating with the speed-responsive means whereby operation of the control device is prevented while the turbine speed is above a predetermined amount.

13. The combination with an electric generator, a turbine for driving the generator, a means responsive to the turbine speed and a control device for the generator, of means co-operating with the speed-responsive means whereby opening operation of the control device is prevented while the turbine speed is above a predetermined amount.

14. The combination with a pair of electric generators, a separate current-responsive element energized from each generator, a group of control devices for each of the said elements, a circuit interrupter for connecting the said elements with one of the generators, a control mechanism for each generator and a separate interlocking mechanism for controlling the said control devices of each group thereof and controlled by the said control mechanism, of a means for simultaneously closing the said connecting interrupter and connecting the interlocking mechanism whereby the control devices of each group are controlled by the control mechanism for the generator to which the current-responsive elements are connected.

15. The combination with a pair of electric generators, a separate current-responsive element energized from each generator, control devices for said elements, a circuit interrupter for connecting the said elements with one of the generators, an interlocking control mechanism for controlling the said control devices of each group thereof and controlled by the said control mechanism, of a single operating means for closing the said connecting interrupter and connecting the interlocking mechanism whereby the control devices of each group are controlled by the control mechanism for the generator to which the current-responsive elements are connected.

16. Control mechanism for an electric generator comprising a resistance device, an operating lever for actuating the resistance device and movable to open and closed positions and a switch member for the generator so connected to the said lever that it is moved to open or closed positions only when the lever is moved to extreme open or closed positions.

In testimony whereof, we have hereunto subscribed our names this 22nd day of August, 1921.

JOHN B. MacNEILL.
ANDREW H. BAKKEN.
CURTIS A. TUCKER.